Figures 1, 2:
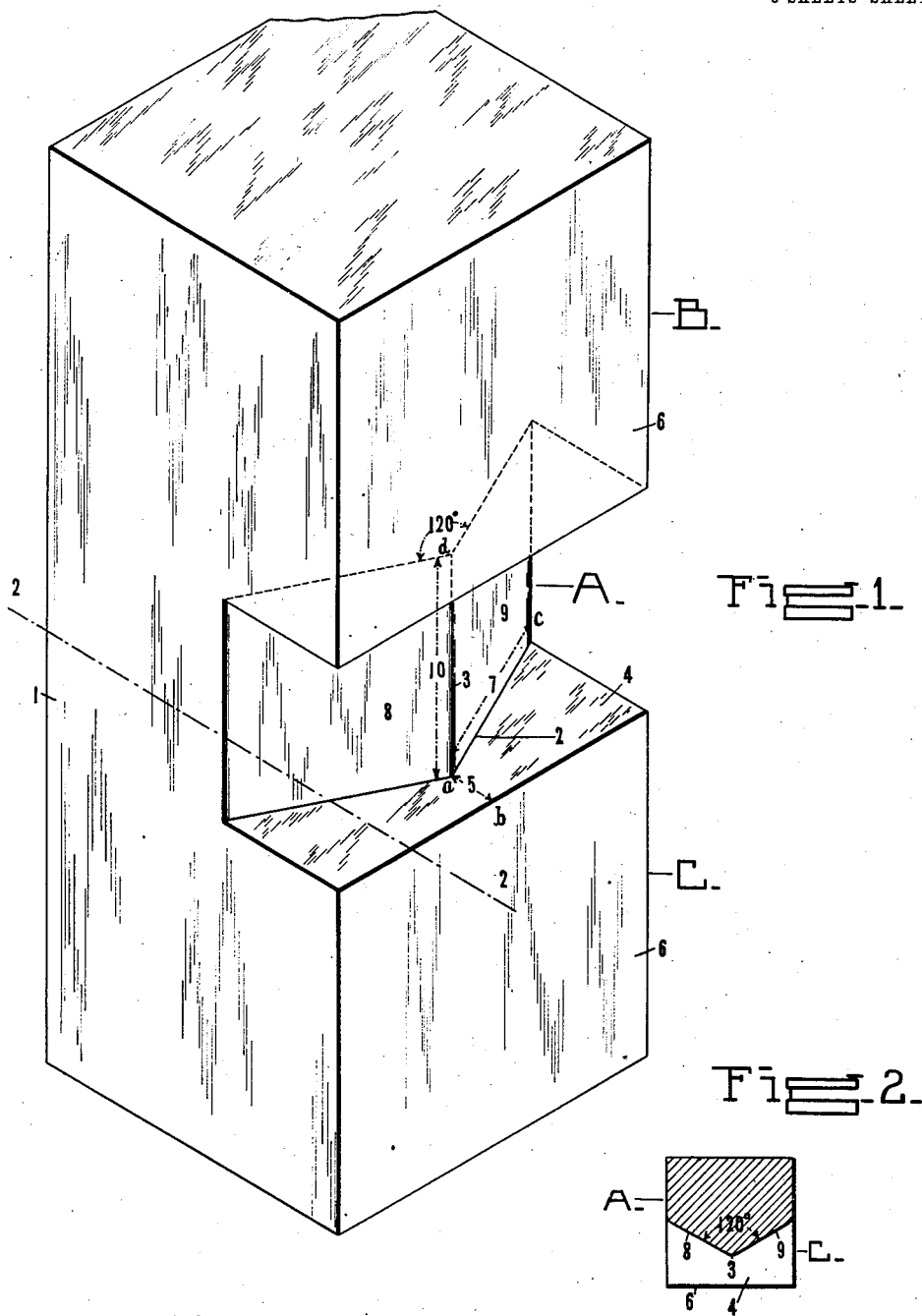
Figure 12:
Figure 11:
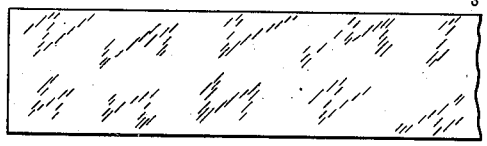
Figure 14:
Figure 13:
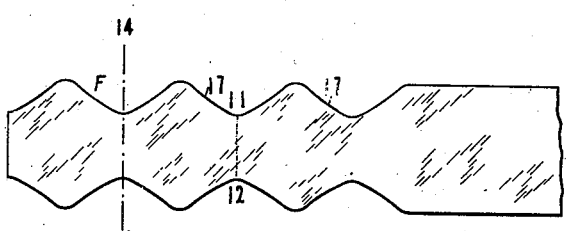
Figure 16:
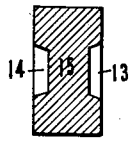
Figure 15:
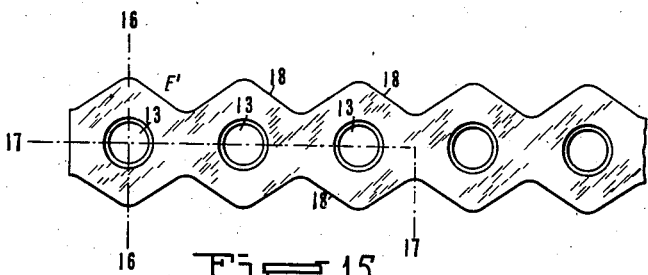
Figure 17:
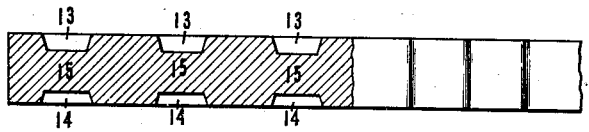
Figure 18:
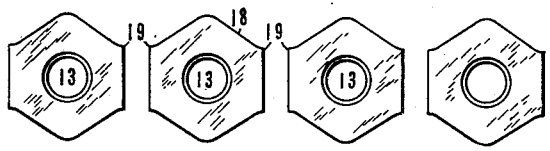

W. L. WARD.
ART OF PRODUCING NUT BLANKS FROM STOCK BARS.
APPLICATION FILED DEC. 8, 1909.

998,215.

Patented July 18, 1911.

3 SHEETS—SHEET 1.

WITNESSES:

INVENTOR

ATTORNEYS.

W. L. WARD.
ART OF PRODUCING NUT BLANKS FROM STOCK BARS.
APPLICATION FILED DEC. 8, 1909.
998,215. Patented July 18, 1911.
3 SHEETS—SHEET 2.
Fig-4-
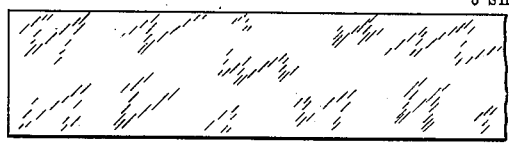
Fig-3-
Fig-6-
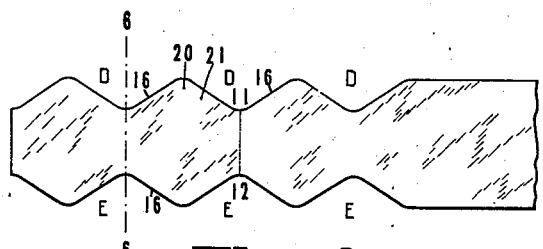
Fig-5-
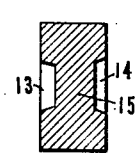
Fig-8-
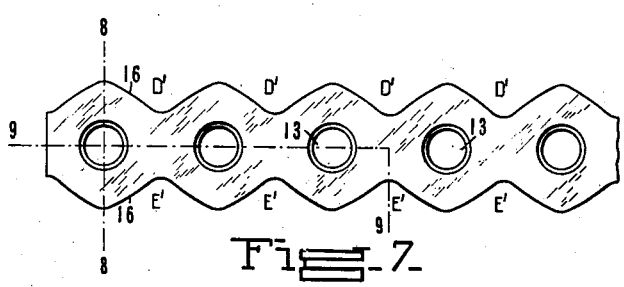
Fig-7-
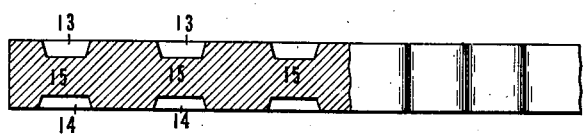
Fig-9-
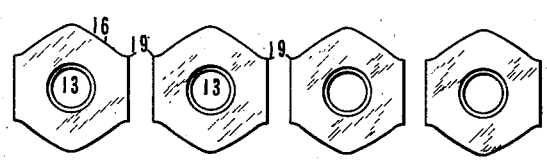
Fig-10-
WITNESSES:
INVENTOR
W. L. Ward
BY
ATTORNEYS W. L. WARD.
ART OF PRODUCING NUT BLANKS FROM STOCK BARS.
APPLICATION FILED DEC. 8, 1909.

998,215.

Patented July 18, 1911.

3 SHEETS—SHEET 3.

WITNESSES:

INVENTOR
W. L. Ward
BY
ATTORNEYS.

UNITED STATES PATENT OFFICE.

WILLIAM L. WARD, OF PORT CHESTER, NEW YORK.

ART OF PRODUCING NUT-BLANKS FROM STOCK-BARS.

998,215.   Specification of Letters Patent.   Patented July 18, 1911.

Application filed December 8, 1909. Serial No. 532,071.

*To all whom it may concern:*

Be it known that I, WILLIAM L. WARD, a citizen of the United States, residing at Port Chester, in the county of Westchester and State of New York, have invented certain new and useful Improvements in the Art of Producing Nut-Blanks from Stock-Bars, of which the following is a full, clear, and exact description, such as will enable others skilled in the art to which it appertains to make and use the same.

This invention deals with certain improvements in the art of producing nut-blanks from stock-bars, but inasmuch as certain noteworthy characteristics of the invention prominently appear in its more intense aspect as a method of producing hexagonal nut-blanks by cold swaging notches and pits in a rectangular elongated stock-bar and then shearing nut-blanks therefrom, all in such manner as to eliminate hitherto unavoidable waste, it will be conducive to clearness to specifically disclose the same through this embodiment thereof.

As an introductory to a more detailed discussion of the novel features underlying the commercial utility of this method, it may be preliminarily noted that, for various reasons well understood by those skilled in this art, it is desirable to produce nut-blanks, from stock-bars of an inexpensive character easily obtainable from various sources, by operations effected under normal temperatures and without the necessity of shaping the material while in a highly heated condition. The production of high grade hexagonal nut-blanks from such an ordinary stock-bar by means of an essentially economic method as free as possible from the numerous practical difficulties naturally associated with such a proposal, has therefore been the goal for which those commercially engaged in the art of making nuts have long striven. It is desirable that the original stock-bar shall first be so modified in form as to bring it into a condition particularly well adapted for enabling nut-blanks of approximately the predetermined contour to be readily sheared therefrom, and to that end it has been proposed to provide the two narrow elongated edges of the stock-bar with a series of notches (various arrangements having been suggested) more or less closely corresponding to counterpart faces of the nut-blanks to be ultimately severed from such stock-bar. This preliminary step, however, has been found in practice to present certain serious difficulties, which have not been satisfactorily overcome by any method heretofore available or obvious to those skilled in this art. To briefly explain, it may be stated that in the art of shaping metals two procedures, each having a status distinct from that of the other and involving totally different considerations, have been available, first, by operating on the metal while hot, and thus in a condition readily capable of being shaped by comparatively slight pressures; and, second, operating on the metal while cold, and thus in a condition offering such great resistance and other difficulties as to preclude the practical availability of swaging operations in heavy work and compel a resort to shearing or cutting operations.

The advantages residing in the handling of hot metal, especially so far as the formation of nut-blanks are concerned, are offset by certain important objections, such as the expense and difficulty accruing to the treatment of red-hot metal, and the fact that the metal when thus treated is not in the best physical condition from the standpoint of density, tensile strength, fiber stress, and the like. On the other hand, all obvious methods of producing the serrated stock-bar by operations effected in the cold, have been heretofore unavoidably accompanied by other objections. For example, the formation of this serrated stock-bar by successively shearing or cutting a multiplicity of small wedge-shaped pieces from the side of the stock-bar, is inevitably attended with a loss representing in the total a very large percentage of the material of the original bar, but for want of a better, such a method has been thus far, perhaps, more widely practiced than any other. It has not been deemed feasible to endeavor to save this waste by swaging the notches in the cold original bar instead of cutting out portions thereof, inasmuch as great difficulty is experienced in practice by reason of the fact that this swaging if performed by any heretofore available method, either produces very undesirable distortions and excessive strains in the stock-bar, or sets up fractures therein. That is to say, the bar will be unduly thickened or otherwise locally strained adjacent the notches, and will not be in the best condition for the subsequent shearing of the nut-blanks therefrom. This fact, coupled with the failure to properly perceive the essential character and arrangement of the notches which may feasibly be formed in the cold, has precluded the commercial use of heretofore available dies in such manner as to move in a substantially rectilinear direction, i. e., "translate" to produce the notches in the stock-bar by a comparatively limited local application of cold-swaging pressures. It has furthermore not been deemed feasible to roll or knurl the notches in the side of the cold stock-bar, because not only does the machinery designed for such an operation require an application over an extensive area of the enormous pressures necessary in swaging cold metal, but the effect of the rolling contact is to create undesirable departures from the sought for predetermined shape of the notches, that is to say, the latter will have more or less abnormal shapes depending upon the size of the rollers employed.

Now this invention has in contemplation the formulation of an essentially commercial method of producing nut-blanks from cold elongated stock-bars having a suitable cross-section such as a rectangular in which, as one of the various steps resulting in the completely finished blank, the original stock-bar will be preliminarily converted into a serrated and preferably also pitted stock-bar having in each of its sides a series of notches of the hereinafter specified shape, depth, and spacing, and in which the length of the resultant notched stock-bar will be considerably greater than that of the original stock-bar. That is to say, instead of having a loss corresponding to the spaces presented by the notches, or instead of having a resultant bar unduly distorted in certain spots, this invention affords a properly formed notched and pitted bar in which the material represented by the spaces of the serrations may be said to have been utilized by way of an increased length in the bar, thus enabling a greater number of nut-blanks to be successively cut from the original bar than would otherwise appear possible. In carrying out this method, the notches will not only possess the hereinafter specified form and relationship but are produced (not by cutting or shearing) but by a cold-swaging operation effected through the instrumentality of dies having a lateral movement in an intermittent rectilinear direction, i. e., a movement substantially of translation toward the stock-bar as distinguished from a continuous purely rotary movement or rolling along the stock-bar and with this intermittent operation there is essentially associated a lateral restriction of the distortion with a concomitant flow of metal in directions parallel with the length of the bar, thus preventing any intermediate swelling or increased thickness in the bar.

To promote a full understanding as to the manner in which this process may be availed of to produce nut-blanks from a cold stock-bar; the character and disposition of the notches and pits most suitable for the ends in view; as well as the preferred construction and arrangement of parts constituting a means instrumental in so doing, drawings exemplifying a preferred embodiment have been appended as a part of this disclosure, and in such drawings like characters of reference denote corresponding parts throughout the several views of which:

Figure 1 exemplifies in perspective a preferred form of die capable of swaging the notches or serrations in the sides of the bar, while simultaneously supporting the top and bottom portions thereof to prevent the above mentioned undesirable distortions. Fig. 2 is a horizontal section taken along line 2—2 on Fig. 1 and showing more clearly the formation of the angular swaging projection. Fig. 3 is a plan view exemplifying an ordinary elongated stock bar having a rectangular cross section. Fig. 4 is an end view of the stock bar shown by Fig. 3. Fig. 5 is a plan view showing the stock bar after a few of the notches or serrations have been swaged therein, and illustrating approximately the preferred form and character of said notches. Fig. 6 is a section taken along line 6—6 of the serrated bar shown in Fig. 5. Fig. 7 illustrates a further step of this process in which the serrated stock-bar has been indented with a series of top and bottom opposed alined recesses. Fig. 8 is a section taken along line 8—8 of the bar shown in Fig. 7. Fig. 9 is a section taken along line 9—9 of Fig. 7. Fig. 10 shows the serrated and indented stock-bar divided into its component units or sections, each of which approximates the shape of the ultimate finished nut-blank. Figs. 11 to 18 inclusive correspond to Figs. 3 to 10 inclusive, respectively, except in that they show side notches formed by means of a swaging die having slightly convexed faces designed to counteract the slight side bulging of the serrated stock bar produced through the operation of indenting or piercing the top and bottom recesses therein.

Continuing now by way of a more detailed description of this invention, it will perhaps promote clearness to first describe the illustrated side-swaging die which, while typical of a means instrumental in practicing this invention, may of course, assume various forms within the purview of this invention. Turning to Figs. 1 and 2, A depicts the intermediate or swaging portion of the die which is preferably, though not necessarily formed integral with the upper and lower or so-called restricting parts B and C of the die.

The swaging part of the die consists of a base portion 1, terminated at its forward end in a V-shaped projection 2. This V-shaped projection will be so designed as to subtend between its two adjacent converging sides 8 and 9 an angle approximately equal to that produced when two of the finished nuts are placed together with corresponding faces contacting and in registry. Thus, in adapting the die for the commercial production of hexagonal nuts, the angles subtended by the two converging sides of the V-shaped swaging projection 2 will be approximately 120°. In such case, the extreme tip or apex 3 of the swaging point will preferably be slightly blunted, as illustrated, so that through the operation of swaging, there will be no tendency to cleave or split the stock-bar undergoing deformation, and at the same time the narrow portion bridging two adjacent sections of the serrated stock-bar will be provided with a sufficient excess of material or length to enable the faces thereof to be finished after shearing the bar into its component sections.

The upper and lower restricting parts of the die (which is preferably formed from a single solid piece of die steel) present flat faces 4, which extend forwardly from the converging vertical side faces of the swaging projection to such an extent as to provide the distance 5, from point "a" to "b", so as to position the extreme forward apex of the swaging projection back from the front edges of the restricting parts, i. e., countersunk with respect to the front vertical faces 6 of the restricting parts "B" and "C". Preferably this distance 5 approximates or falls slightly short of about one-half the distance 7 (from point "a" to point "c"), denoting the length of the effective portions of the converging faces 8 and 9 of the swaging projection, or, in other words, approximately corresponds to one-half the width of one of the faces of a polygonal nut of the character intended to be ultimately produced. The front faces 6 of the upper and lower restricting parts of the die are preferably arranged perpendicular to the path of movement of the die; and the height 10 of the swaging projection, i. e., the distance between the points "a" and "d", is only slightly greater than the thickness of the stock bar so that the upper and lower internal faces 4 of the restricting parts may act as supports for the material of the stock bar at points adjacent the swage lines, and thus be effective to prevent distortion where the tendency to distort is greatest and least desired. The width of the front faces 6, while subject to considerable variation, is preferably proportioned to come flush with the distance between the points of the converging faces 8 and 9 last contacting with the stock bar during the act of swaging.

Turning now to Figs 3 to 10 inclusive, which represent a stock-bar undergoing alteration in the various stages of this process, it may be stated that, as a preliminary step in this process, it is proposed to indent the sides of such cross-bar while the latter is under normal temperatures, or, to use the terminology of the art, when the metal is "cold." This is performed through the instrumentality of a pair of dies such as that just described which are preferably arranged to alternately approach and recede from one another in such manner as to successively impress the narrow longitudinal edges of the stock-bar; which dies preferably have during this operation, a movement known as that of "translation," as distinguished from a purely rotary or rolling movement. In other words, the relative movement between the dies is substantially a directly rectilinear movement, and the stock bar also intermittently feeds forwardly between these two dies, so that in this operation the V-shaped swaging portion of these dies will contact with the narrow elongated edges of the stock-bar and indent the same, as illustrated by Fig. 5. In this connection, attention is particularly directed to the fact that the notches D—D—D and E—E—E— are so designed and disposed that the bar at its narrowest portion (the distances between the nearest apices of each pair of notches) will only very slightly exceed the length of one of the six faces of the haxagonal nut to be produced. This proportion is attained by causing the dies to approach to such an extent that each apex will be forced into the stock-bar a distance approximately equal to one-quarter of the total width of the bar. In other words, the stock-bar is serrated in such a manner that a shear line such as 11—12 of Fig. 5 will approximately correspond to one of the faces of the hexagonal nut. It is also to be noted that the internal apices of notches D—D—D and E—E—E are slightly blunted or flattened, which fact (taken in connection with the utilization, arrangement and disposition in which the indentations are comparatively shallow, while yet sufficiently conforming to the sides of the finished nut) further conduces to a successful swaging of the notches in the cold without danger of splitting or cleaving the cold and comparatively non-ductile steel. A further advantage consisting in making these internal apices flattened instead of sharp, as has been heretofore proposed, resides in the fact that the detached section, as shown by Fig. 10, has a slight excess of metal 19 adjacent the shear sides, thus enabling the roughness produced by the shearing to be trimmed off and made perfect in finishing dies, with the further advantage that the loss of material in this way is exceedingly small.

As an essential concomitant to the swaging of the notches in the stock bar by means of the above described dies, this invention furthermore proposes to so support the top and bottom faces of the stock bar as to preclude any undue displacement of metal in a direction either upwardly or downwardly, that is to say, where there is a pronounced tendency of the V-shaped swaging portions of the die to produce a flow of metal in a direction intending to increase the thickness of the stock-bar, especially at points 20 and 21 (Fig. 5) closely adjacent the edges of the V-shaped notches. This action or tendency is effectively prevented by utilizing the unyielding upper and lower restricting portions of the die during the swaging operation. When the dies approach, preparatory to swaging, such upper and lower overhanging portions first ride over and overlap or straddle the stock-bar and then the swaging operation begins and is so restrained as to preclude a bulging of the stock-bar. Another step in the nature of a refinement to this process consists in punching recesses in either the top or bottom face, or both, of the stock-bar, preferably after swaging the serrations as indicated by Figs. 7, 8 and 9. Thus a circular indentation 13 may be pressed into the top face of each of the sections of the stock bar by means of a suitable counterpart punch, and also bottom recess 14 may be provided in alinement with the top recess 13. The bottom recess 14 may be slightly larger in diameter if desired to facilitate the removal of the intervening plug of metal 15 during a subsequent operation. In indenting the recesses 13 and 14 there will be a tendency of the metal to distort laterally and thus cause the sides 16 of the V-shaped notches to bulge outwardly and assume a curvilinear contour somewhat as shown by Fig. 7. If it is desired to prevent this, the side faces of the V-shaped swaging projection may be convexed so as to produce the counterpart concave sides 17 shown in Fig. 13, and thus so proportioning the parts that the bulging obtained during the top and bottom recessing will bring such sides approximately plane as indicated by 18 in Fig. 15.

It is to be understood that the term "inclined sides" used herein as descriptive of certain features of the V-shaped swaging projection, has reference only to the effective portions or areas of such faces as may be used, and does not, of course, apply to such surfaces of the inclined swaging faces or sides as constitute non-swaging areas or merely form continuations or extensions of the effective faces, and, accordingly, dimensional references to such elements are to be taken as descriptive of effective parts thereof. So, also, the term "rectangular cross-section" as applied to the cross-bar, is to be regarded in a generic or practical sense as comprehending such diversely modified cross-sections of the stock-bar as may be required in the various refinements of this invention, and is not to be taken in the rigidly precise manner required of purely geometrical definitions. Furthermore, in speaking of the top, bottom, etc., such terms have been adopted as a matter of brevity and clearness and do not carry an implication tending to limit the position of the element having such feature.

Without further elaboration, and in the light of current knowledge, the foregoing disclosure will sufficiently suggest and otherwise enable those skilled in this art to readily utilize various interchangeably available and mechanically equivalent steps and treatments which, although perhaps calculated to appear widely different under a superficial inspection, and follow in a varied sequence, would nevertheless embody certain, if not all of the herein-described features which, from the aspect of the prior art, constitute essential and advantageous characteristics of this invention, and therefore such processes should and accordingly are intended to be comprehended in the wording and scope of the following claims.

Having described my invention, what I claim as new and desire to secure by Letters Patent is:

1. A method of the nature disclosed for making polygonal nut-blanks from cold metal, consisting in causing a pair of swaging dies having opposing V-shaped projections terminating in blunt apices to simultaneously approach and recede in substantially a rectilinear direction transverse to a stock-bar, interposing a cold elongated stock-bar having a rectangular cross-section in the path of said swaging dies whereby comparatively shallow V-shaped notches having blunted apices may be cold-swaged in the narrow sides of said stock-bar, simultaneously supporting the top and bottom portions of said bar adjacent said notches to restrict the flow of metal under the distorting action of said side-swaging dies, and intermittently feeding said stock-bar into successive relations with said swaging dies whereby a series of equi-spaced notches may be formed.

2. A method of the nature disclosed for making polygonal nut-blanks from cold metal consisting in interposing an elongated cold stock-bar having a rectangular cross-section between the opposing ends of a pair of swaging dies, each having a single V-shaped projection extending centrally from its end, translating said swaging dies to simultaneously cause each of the V-shaped projections to indent the narrow sides of said stock-bar a distance approximately equal to one-fourth the total width of said bar and thus cold-swage comparatively shallow V-shaped notches therein, simultaneously supporting the top and bottom portions of said bar adjacent said notches during the swaging thereof to prevent said bar from thickening under the distorting action of said side swaging dies, and intermittently feeding said stock-bar to enable said dies to produce equi-spaced notches.

3. A method of the nature disclosed for making hexagonal nut-blanks from cold metal consisting in interposing an elongated stock-bar having a rectangular cross-section between a pair of swaging dies each having in its operative end a V-shaped projection forming an angle of about 120°, producing a relative translation between said dies whereby the distance between said opposing V-shaped ends may be reduced until equal to one-half the width of the bar with the resultant formation of V-shaped notches in the narrow sides of said cold stock-bar, simultaneously supporting the top and bottom portions of said bar adjacent said notches and in advance thereof to restrict the flow of metal under the distortion of said side swaging dies, and intermittently feeding said stock-bar to enable said dies to produce a succession of equi-spaced notches therein.

4. A method of the nature disclosed for making hexagonal nut-blanks from cold metal, consisting in interposing an elongated stock-bar having a rectangular cross-section in the path of a pair of swaging dies having at their ends opposing V-shaped projections terminating in blunted apices and forming an angle of about 120°, reducing the distance between said ends until it approximately equals the width of a face of the nut to be formed and thereby swaging counterpart comparatively shallow notches having blunted apices in the sides of said stock-bar, simultaneously supporting the top and bottom portions of said bar adjacent said notches to restrict the flow of metal under the distortion of said side swaging dies, and intermittently feeding said stock-bar to produce a serrated bar exceeding the original length of said stock-bar.

5. A method of the nature disclosed for making polygonal nut-blanks, consisting in causing a pair of similar swaging dies, each having in its end a single V-shaped projection, to simultaneously approach in substantially a rectilinear direction until the two apices of said V-shaped projections are spaced apart a distance approximately equal to the width of a side-face of the polygonal nut to be formed, interposing an elongated stock-bar having a rectangular cross-section in the path of said swaging dies whereby opposing V-shaped notches may be swaged part way into the narrow sides of said stock-bar, simultaneously supporting the top and bottom portions of said bar adjacent said notches in advance of the apices of the projections to restrict the flow of metal under the distortion of said side-swaging dies, and intermittently feeding said stock-bar into successive relations with said swaging whereby a series of equi-spaced relatively shallow notches may be formed.

6. A method of the nature disclosed for making hexagonal nut-blanks, consisting in interposing an elongated stock-bar having a rectangular cross-section between a pair of oppositely positioned swaging dies, each having in its end a single V-shaped projection having a blunted apex and forming an angle of approximately 120°, simultaneously translating said swaging dies to cause their V-shaped ends to indent the narrow sides of said stock-bar and therein swage V-shaped notches oppositely distant from one another by approximately the width of a face of the hexagonal nut to be formed, simultaneously supporting the top and bottom portions of said bar in advance of the apex of said projection and adjacent said notches to prevent said bar from thickening under the distortion of said stock-bar, and intermittently feeding said stock-bar to enable said dies to produce a succession of equi-spaced notches therein.

7. A method of the nature disclosed for making polygonal nut blanks, consisting in interposing an elongated stock bar having a rectangular cross section in the path of a pair of oppositely positioned swaging dies, each having at its end a V-shaped projection, causing a relative translation between said dies whereby the V-shaped notches will be swaged part way into the narrow sides of said stock bar until the apices of said notches are oppositely distant from one another by approximately the width of the face of the nut to be formed, simultaneously supporting the top and bottom portions of said bar adjacent said notches and in advance of the apices of the projections to prevent a thickening of said bar in consequence of the flow of metal produced by said side swaging dies, and intermittently feeding said stock bar between said dies to produce a serrated bar of greater length than the original bar and having in its sides a series of equi-spaced notches.

8. A method of the nature disclosed for making nut-blanks, consisting in interposing an elongated stock-bar having a rectangular cross-section between a pair of swaging dies, each having in its end a single V-shaped projection terminating in a blunted apex forming an angle of approximately 120°, producing a relative translation between said dies whereby the distance between the apices of said opposing V-shaped ends may be reduced to a distance not substantially less than the width of one of the faces of the nut to be made with the resultant formation of relatively shallow V-shaped notches having blunted apices in the narrow sides, simultaneously supporting the top and bottom portions of said bar adjacent said notches to restrict the flow of metal under the distortion of said side swaging dies, and intermittently feeding said stock-bar to produce a serrated bar exceeding the original length of said stock-bar.

9. A method of the nature disclosed for making polygonal nut-blanks from cold metal, consisting in causing a pair of swaging dies having opposing V-shaped ends having convexed faces to simultaneously approach and recede in substantially a rectilinear direction transverse to a stock-bar, interposing a cold elongated stock-bar having a rectangular cross-section in the path of said swaging dies whereby comparatively shallow V-shaped notches may be cold-swaged in the narrow sides of said stock-bar, simultaneously supporting the top and bottom portions of said bar adjacent said notches to restrict the flow of metal under the distortion of said side-swaging dies, intermittently feeding said stock-bar into successive relations with said swaging dies whereby a series of equi-spaced notches may be formed, and rendering the concaved faces approximately plane by indenting a series of concavities in the top face of said bar, whereby each concavity will be central of the respective bulging portions of said bar.

10. A method of the nature disclosed for making polygonal nut-blanks from cold metal consisting in interposing an elongated cold stock-bar having a rectangular cross-section between the opposing ends of a pair of swaging dies, each having a single V-shaped projection having convexed faces extending centrally from its end, translating said swaging dies to simultaneously cause each of their V-shaped ends to equally indent the narrow sides of said stock-bar and cold-swage comparatively shallow V-shaped notches having concaved faces therein, simultaneously supporting the top and bottom portions of said bar adjacent said notches to prevent said bar from thickening under the distortion of said side swaging dies, intermittently feeding said stock-bar to enable said dies to produce equi-spaced notches, and piercing the top face of said bar centrally of each two pairs of notches to render said concaved faces approximately plane.

11. A method of the nature disclosed for making polygonal nut-blanks from cold metal consisting in interposing an elongated cold stock-bar having a rectangular cross-section in the path of a pair of oppositely positioned swaging dies having V-shaped ends provided with convexed sides, causing a relative translation between said dies whereby V-shaped notches having concaved sides will be cold-swaged into the narrow sides of said stock-bar, simultaneously supporting the top and bottom portions of said bar adjacent said notches to prevent a thickening of said bar in consequence of the flow of metal produced by said side swaging dies, intermittently feeding said stock-bar between said dies to produce a succession of equi-spaced notches therein, and thereafter simultaneously indenting alined concavities part way through the top and bottom portions of said stock-bar to reduce the concavities in the faces of the resultant serrated bar.

12. A method of the nature disclosed for making hexagonal nut-blanks from cold metal consisting in interposing an elongated stock-bar having a rectangular cross-section between a pair of swaging dies each having in its operative end a V-shaped projection having convexed faces forming an angle of about 120°, producing a relative translation between said dies whereby the distance between said opposing V-shaped ends may be reduced with the resultant formation of V-shaped notches having concaved faces in the narrow sides of said cold stock-bar, simultaneously supporting the top and bottom portions of said bar adjacent said notches to restrict the flow of metal under the distortion of said side swaging dies, intermittently feeding said stock-bar to enable said dies to produce a succession of equi-spaced notches therein, and then interposing successive sections of said notched bar between a pair of oppositely reciprocating piercing dies to form a corresponding succession of top and bottom alined concavities therein and simultaneously reduce the concavities of the faces of the resultant serrated bar.

13. A method of the nature disclosed for making polygonal nut-blanks from cold metals, consisting in interposing an elongated stock-bar having a rectangular cross-section in the path of a pair of swaging dies having opposing V-shaped projections having convexed sides terminating in blunted apices, translating one of said dies directly toward the other so as to decrease the distance between said ends until the intervening space approximately equals the width of a face of the nut to be formed and thereby swage precisely counterpart comparatively shallow V-shaped notches having blunted apices in the narrow sides of said stock-bar, simultaneously supporting the top and bottom portions of said bar adjacent said notches to restrict the flow of metal under the distortion of said side swaging dies, intermittently feeding said stock-bar to produce a succession of notches therein, and indenting top and bottom alined concavities in each section of said bar bounded by said notches whereby the concavities of the faces produced by said dies will be diminished.

14. A method of the nature disclosed for making polygonal nut-blanks, consisting in causing a pair of similar swaging dies, each having in its end a single V-shaped projection having convexed faces terminating in a blunted apex, to simultaneously approach in substantially a rectilinear direction until the two apices of said V-shaped projections are spaced apart a distance approximately equal to the width of a side-face of the polygonal nut to be formed, interposing an elongated stock-bar having a rectangular cross-section in the path of said swaging dies whereby opposing V-shaped notches having blunted apices may be swaged part way into the narrow sides of said stock-bar, simultaneously supporting the top and bottom portions of said bar adjacent said notches to restrict the flow of metal under the distortion of said side-swaging dies, intermittently feeding said stock-bar into successive relations with said swaging whereby a series of equi-spaced notches may be formed, and thereafter indenting a recess approximately in the center of each section of said notched bar, whereby the concaved faces produced by said dies will be rendered approximately plane.

15. A method of the nature disclosed for making hexagonal nut-blanks, consisting in interposing an elongated stock-bar having a rectangular cross-section between a pair of oppositely positioned swaging dies, each having in its end a single V-shaped projection the sides of which are convexed and form an angle of approximately 120°, simultaneously translating said swaging dies to cause their V-shaped ends to indent the narrow sides of said stock-bar and therein swage V-shaped notches oppositely distant from one another by approximately the width of a face of the hexagonal nut to be formed, the faces of said notches being concaved, simultaneously supporting the top and bottom portions of said bar adjacent said notches to prevent said bar from thickening under the distortion of said stock-bar, intermittently feeding said stock-bar to enable said dies to produce a succession of equi-spaced notches therein, and thereafter simultaneously indenting in the top and bottom faces of each section a pair of oppositely alined recesses whereby under the flow of metal the concaved faces may be made approximately plane.

16. A method of the nature disclosed for making polygonal nut blanks, consisting in interposing an elongated stock bar having a rectangular cross section in the path of a pair of oppositely positioned swaging dies, each having in its end a V-shaped projection having convexed faces causing a relative translation between said dies, whereby the V-shaped notches will be swaged part way into the narrow sides of said stock bar until the apices of said notches are oppositely distant from one another by approximately the width of a face of the nut to be formed, simultaneously supporting the top and bottom portions of said bar adjacent said notches and in advance of the apices of the projections to prevent a thickening of said bar in consequence of the flow of metal produced by said side swaging dies, and intermittently feeding said stock bar between said dies to produce a serrated bar of greater length than the original bar and having a succession of equi-spaced notches therein.

In testimony whereof I affix my signature, in the presence of two witnesses.

WILLIAM L. WARD.

Witnesses:
WALTER S. CONELY,
R. J. SNYDER.